Aug. 18, 1953  H. H. DUNCAN ET AL  2,649,338
AUXILIARY SPACER FOR DUAL TIRE WHEEL ASSEMBLIES
Filed Oct. 8, 1951
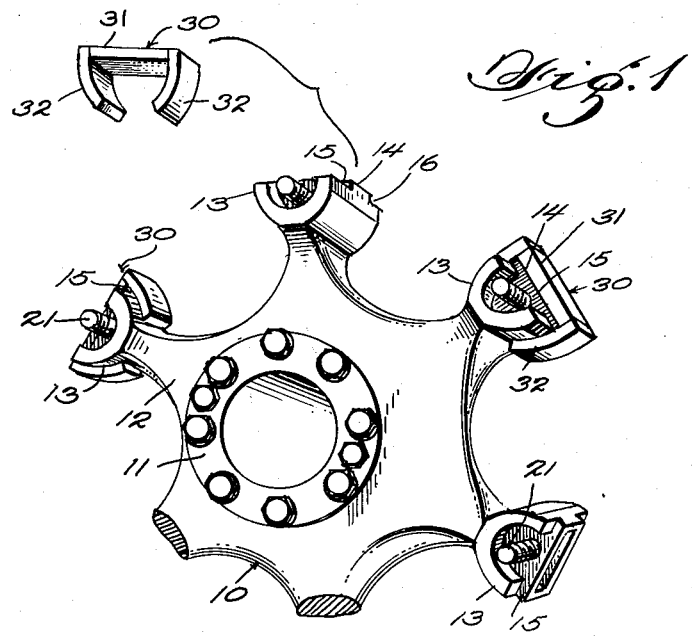
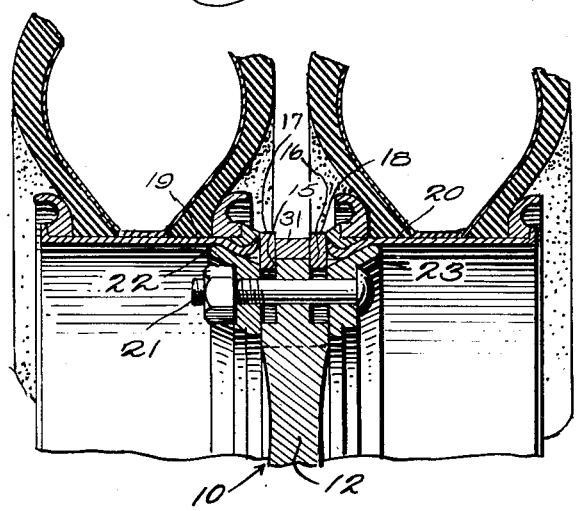
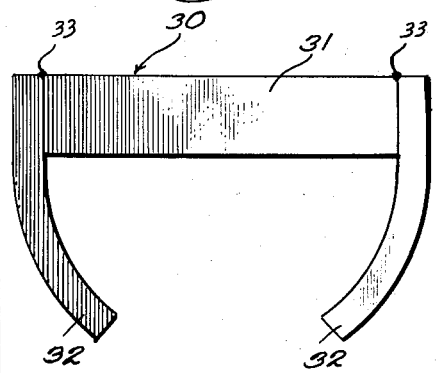
INVENTORS
Harry H. Duncan
and J. W. Volner
BY  W. J. Eccleston,
ATTORNEY Patented Aug. 18, 1953

2,649,338

UNITED STATES PATENT OFFICE 2,649,338

AUXILIARY SPACER FOR DUAL TIRE WHEEL ASSEMBLIES

Harry H. Duncan, Milan, Tenn., and J W Volner, Chandler, Ariz.

Application October 8, 1951, Serial No. 250,376

12 Claims. (Cl. 301—13)

(Granted under Title 35, U. S. Code (1952), sec. 266)

The invention described herein, if patented, may be manufactured and used by or for the Government for governmental purposes, without the payment to us of any royalty thereon.

Our invention relates to improvements in spacer means for dual wheels, particularly to dual wheels of the general type shown in the patent to F. W. Burger, No. 1,829,889, wherein the tire rims of each dual wheel assembly are maintained in uniformly spaced alignment by a pair of spacer rings which bear against rigid means projecting radially outwardly of the outer ends of the wheel spokes.

In such devices, at least the inboard spacer ring is split to permit its application over the radial projections formed on the ends of the spokes. In practice, both spacer rings are usually split rings. As such rings wear, or as the projections become rounded from wear, one ring or the other tends to ride over the fixed projections whereby to permit axial play of the associated tire. Such play causes uneven wear of the tire and may even destroy the valve stem and tube of the same as will be readily understood.

This evil arises from the fact that the fixed projections aforesaid must of necessity not project radially outwardly beyond the innermost periphery of the inboard tire rim as, otherwise, such inboard tire could not be applied over the wheel spider.

With the foregoing in view, it is an object of the invention to provide auxiliary spacer means readily applicable to the spoke ends or equivalent structure in the case of disc wheels and engageable with the spacer rings to supplement the action of the fixed projections in maintaining said spacer rings in rim spacing positions.

A further object is to provide auxiliary spacer elements applicable to at least some of the spoke ends so as to provide radially outward extensions of the fixed projections, said auxiliary spacer means being readily removable from the spoke ends to permit the application of the inboard tire and rim to the assembly.

A further object is to provide auxiliary spacer means which is readily applicable to standard wheel assemblies without modification of the latter and without the use of special tools or the exercise of special skill.

Other objects and advantages reside in the particular structure of the invention, combination and arrangement of the several parts thereof, and will be readily understood by those skilled in the art upon reference to the attached drawing in connection with the following specification, wherein the invention is shown, described and claimed.

In the drawing:

Fig. 1 is a fragmentary perspective view of one form of wheel spider to which the invention is applicable, a part being shown in exploded relation;

Fig. 2 is a fragmentary radial sectional view through a dual wheel assembly showing the device according to the invention in use; and Fig. 3 is an enlarged side elevational view of one form of the device according to the invention apart from the rest of the structure.

Referring specifically to the drawing, wherein like reference characters have been used throughout the several views to designate like parts, 10 designates generally a typical wheel spider conforming substantially to the disclosure of the Burger patent aforesaid.

Thus each wheel spoke 10 may include a hub 11 having a plurality of spokes 12 radiating therefrom. Each spoke 12 may have an enlarged free end 13 which may provide a substantially dove-tail profile, the outer surface of which is formed with a rigid radially outward projection or rib 14 providing oppositely directed shoulders or abutments 15 and 16 respectively seating the outboard and inboard spacer rings 17 and 18 for the outboard and inboard tire rims 19 and 20. The spoke ends 13 are apertured in directions axially of the assembly to receive the usual lug bolts 21 which in turn mount the outboard and inboard tire rim lugs 22 and 23 for securing said rims 19 and 20 in spaced relation on the wheel spider 10.

As aforesaid, the radially outermost surface of the projections or ribs 14 must be just inwardly of the innermost portion of the inboard tire rim 20 to permit such tire rim to be readily placed in position. This structure of necessity provides relatively low shoulders or abutments 15 and 16. Obviously, if the spacer rings 17 and 18 and/or the projections or ribs 14 become worn to any great extent, one or both of the spacer rings may jump the rib 14 and move axially thereover toward the other. Obviously when this occurs, both of the rims 20 or 19 will rub against each other and even become locked together so that one tire will be moved relative to its rim so as to destroy the stem of the tire tube and eventually the tube itself. Even if relative movement between a tire and its rim does not occur, misalignment and resulting uneven wearing of the tires is certain.

The device according to the form of the invention illustrated, comprises an auxiliary spacer means generally indicated at 30 and which may be of channel-shaped configuration so as to provide a web 31 and a pair of substantially convergent flanges 32. As illustrated, the web 31 and flanges 32 are formed separately and welded together as at 33. Obviously, the spacer elements 30 could be formed of one piece of material. The web 31 and flanges 32 are formed to be substantially complementary to the profile of the enlarged spoke ends 13 whereby the elements 30 may be readily applied to the spoke ends by being slid thereon in a direction axially of the assembly 10. In the form illustrated, the width of the webs 31 correspond to the width of the projections or ribs 14 so that the opposite side edges of the webs provide radially outward extensions of the shoulders 15, 16 of the projections or ribs 14. Also, such side edges of the web 31 bear against the spacer rings 17 and 18 so as to maintain the same in tire rim spacing relation irrespective of any wear of such spacer rings and/or any rounding of the shoulders 15 and 16 of the rib 14.

In use, it may not be necessary to provide a separate spacer element for each spoke but, in practice, it may be preferable to do so. Also, it is to be understood that the particular shape of the spacer elements 30 shown and described hereinabove is for use with the particular spoke ends 13, ribs 14 and spacer rings 17, 18 shown. Obviously, where spoke ends of different profile or spacer rings of different cross sectional shape are provided, it is desirable to shape the spacer elements to be complementary thereto. Likewise, the size and design of the auxiliary spacer elements will be varied in accordance with the size and design of the ribs or the like 14 or of the spacer rings 17, 18.

It is obvious, that the auxiliary spacers disclosed are readily applied to standard wheel spider assemblies without the use of special tools or skills and without modification of the assemblies. In addition, it is apparent that the complementary shape of the device and the spoke ends prevents circumferential and radially outward movement of the spacer elements relative to the wheel assembly, while the spacer rings, lugs, etc. prevent lateral sliding of the elements. It is clear, therefore, that the auxiliary spacers provide a simple solution to a problem that has long existed.

Moreover, while we have shown and described what is now thought to be a preferred embodiment of the invention, it is to be understood that the same is susceptible of other forms and expressions. Consequently, we do not limit ourselves to the particular structure shown and described hereinabove except as hereinafter claimed.

We claim:

1. In a dual wheel spider having a hub and a plurality of radiating spokes, the combination with an outwardly projecting rib on each spoke end providing inboard and outboard shoulders seating inboard and outboard spacer rings for the rims of inboard and outboard tires; of auxiliary spacer means for said spacer rings, means mounting said auxiliary spacer means atop said ribs, said auxiliary spacer means having portions projecting outwardly of said ribs and bearing against said spacer rings to supplement the action of said shoulders in preventing axial movement of said spacer rings toward each other.

2. In a dual wheel assembly including a plurality of radiating spokes, the combination with outwardly projecting means on the free ends of said spokes providing inboard and outboard abutments for inboard and outboard spacer rings for the rims of inboard and outboard tires; of detachable auxiliary spacer means for said spacer rings, means mounting said auxiliary spacer means on said free ends of said spokes, and said auxiliary spacer means having portions projecting radially outwardly of said outwardly projecting means and bearing against said spacer rings to supplement the action of said shoulders in preventing axial movement of said spacer rings toward each other.

3. The structure of claim 2, wherein said auxiliary spacer means comprise a plurality of separate elements, each of said elements being mounted on a separate spoke.

4. The structure of claim 2, wherein said auxiliary spacer means comprises a separate auxiliary spacer element on each spoke.

5. The structure of claim 4, wherein each auxiliary spacer element includes means complementary to a spoke end whereby said element is axially slidable onto and off of said spoke end with one of said rims and spacer rings removed, and said last named means being interlocked with said spoke end to prevent radially outward movement of said spacer element relative to said wheel assembly.

6. In a dual wheel assembly including a spoke providing portion having a radially disposed outer edge formed with a radially outwardly projecting circumferentially disposed means providing inboard and outboard abutments respectively for inboard and outboard spacer rings for inboard and outboard tire rims; the improvement comprising auxiliary spacer means for said spacer rings, means mounting said auxiliary spacer means on said outer edge, said auxiliary spacer means having spacer portions projecting radially outwardly of said radially outwardly projecting means, and said spacer portions having oppositely directed faces bearing against said spacer rings to maintain said spacer rings in tire rim spacing relation.

7. The structure of claim 6, wherein said spoke providing means and said auxiliary spacer means include complementary interlocking portions preventing radially outward and circumferential movement of said auxiliary spacer means relative to said assembly but permitting axial sliding movement relative thereto with one spacer ring and rim removed.

8. The structure of claim 6, wherein said auxiliary spacer means comprises a plurality of separate spacer elements disposed in spaced relation about said radially disposed outer edge of said assembly.

9. The structure of claim 8, wherein said spoke providing portion comprises a plurality of spaced spokes.

10. The structure of claim 9, wherein there is provided a separate spacer element mounted on each spoke.

11. The structure of claim 10, wherein each spoke includes an outer free end of substantially dove-tailed form, and each spacer element includes substantially radially inwardly directed portions complementary to said dove-tailed spoke ends whereby to be slidably engageable therewith.

12. In a dual wheel spider including a hub and a plurality of radiating spokes, each spoke having an enlarged free and provided with a circumferentially disposed rib forming inboard and outboard shoulders seating respectively inboard and outboard spacer rings for the rims of inboard and outboard tires; the improvement comprising auxiliary spacer elements for said spacer rings, each spacer element comprising a channel-shaped member having a web and a pair of spaced flanges extending therefrom in substantially converging directions, said channel-shaped members being substantially complementary to said ends of said spokes whereby to be slidable onto and off of the same, and said webs of said channel-shaped members extending longitudinally of said ribs and comprising radial extensions of the same, said webs having oppositely directed edge portions engaging said spacer rings to maintain said spacer rings in tire rim spacing relation.

HARRY H. DUNCAN.
J W VOLNER.

References Cited in the file of this patent

UNITED STATES PATENTS

| Number | Name | Date |
| --- | --- | --- |
| 1,912,110 | Waterbor | May 30, 1933 |
| 2,001,407 | Burger | May 14, 1935 |
| 2,152,757 | Burger | Apr. 4, 1939 |
| 2,280,746 | Burger | Apr. 21, 1942 |